United States Patent [19]

Jacquet

[11] 4,402,486
[45] Sep. 6, 1983

[54] DEVICE FOR MOUNTING OF A SHUTTER IN A PIPING OF A HEATING OR AIR-CONDITIONING INSTALLATION OF A MOTOR VEHICLE

[75] Inventor: Maurice A. Jacquet, Maurepas, France

[73] Assignee: Valeo, Paris, France

[21] Appl. No.: 234,917

[22] Filed: Feb. 17, 1981

[30] Foreign Application Priority Data

Feb. 18, 1980 [FR] France ............................... 80 03502

[51] Int. Cl.³ .......................................... F16K 1/228
[52] U.S. Cl. ........................................ 251/306; 98/2
[58] Field of Search ................... 98/2, 41 R; 137/375; 251/214, 305, 306

[56] References Cited

U.S. PATENT DOCUMENTS

| | | | |
|---|---|---|---|
| 2,022,395 | 11/1935 | White et al. | 251/306 |
| 2,605,688 | 8/1952 | Hezler. | |
| 2,883,149 | 4/1959 | Fiorentini | 251/306 |
| 3,048,362 | 8/1962 | Scarborough | 251/214 |
| 3,128,078 | 4/1974 | Kosik | 251/214 |
| 3,354,808 | 11/1967 | Macrow. | |
| 3,357,680 | 12/1967 | Williams | 251/305 |
| 3,447,780 | 6/1969 | Hobson, Jr. | 251/306 |
| 3,532,321 | 10/1970 | Bowman et al. | 251/306 X |

FOREIGN PATENT DOCUMENTS

| | | |
|---|---|---|
| 2229978 | 6/1972 | Fed. Rep. of Germany. |
| 2510944 | 3/1975 | Fed. Rep. of Germany. |
| 2435125 | 2/1976 | Fed. Rep. of Germany ...... 251/306 |
| 2757651 | 12/1977 | Fed. Rep. of Germany. |
| 2846439 | 5/1979 | Fed. Rep. of Germany ...... 251/306 |
| 1324566 | 3/1963 | France. |
| 2063253 | 6/1971 | France. |
| 2215043 | 8/1974 | France. |
| 2349463 | 4/1977 | France. |
| 2398348 | 7/1977 | France. |
| 1550836 | 8/1976 | United Kingdom. |

Primary Examiner—Albert J. Makay
Assistant Examiner—Harold Joyce
Attorney, Agent, or Firm—Hane, Roberts, Spiecens & Cohen

[57] ABSTRACT

A device for rotatably mounting a shutter in a piping of an air-conditioning installation of an automotive vehicle, wherein the wall of the piping comprises bearings cooperating with cylindrical end-pieces of the shutter and cylindrical projections surrounding the bearings and cooperating with tubular sealing lips of the shutter.

15 Claims, 6 Drawing Figures

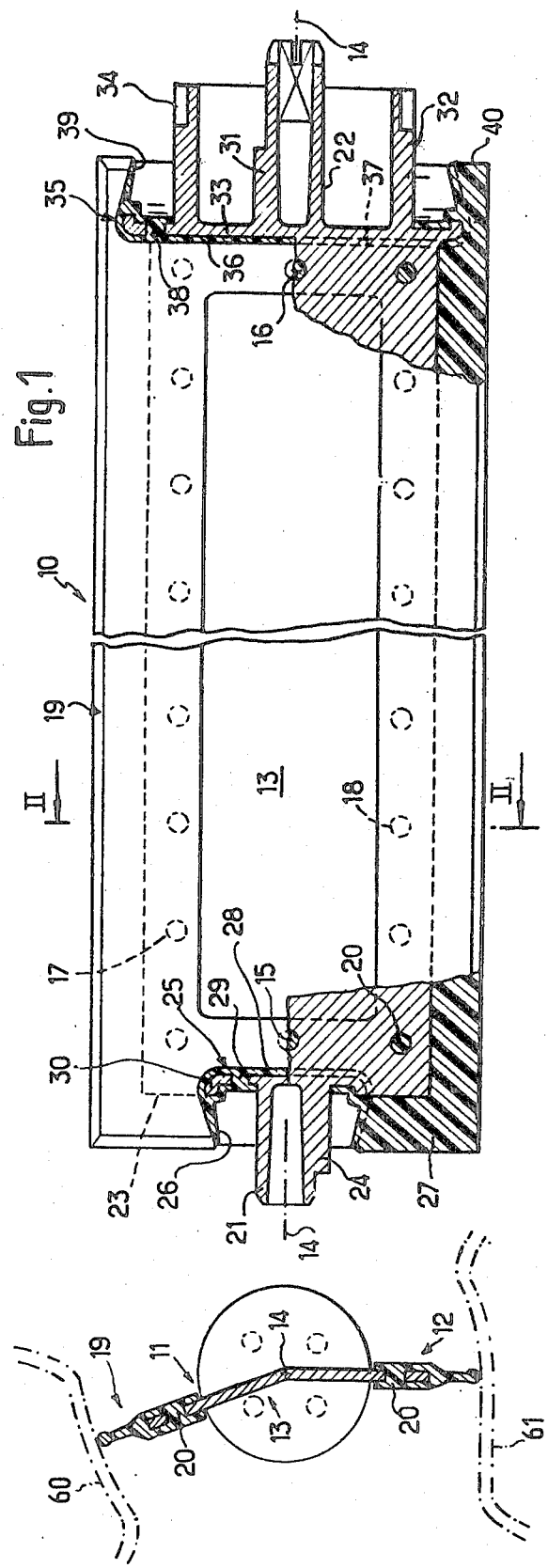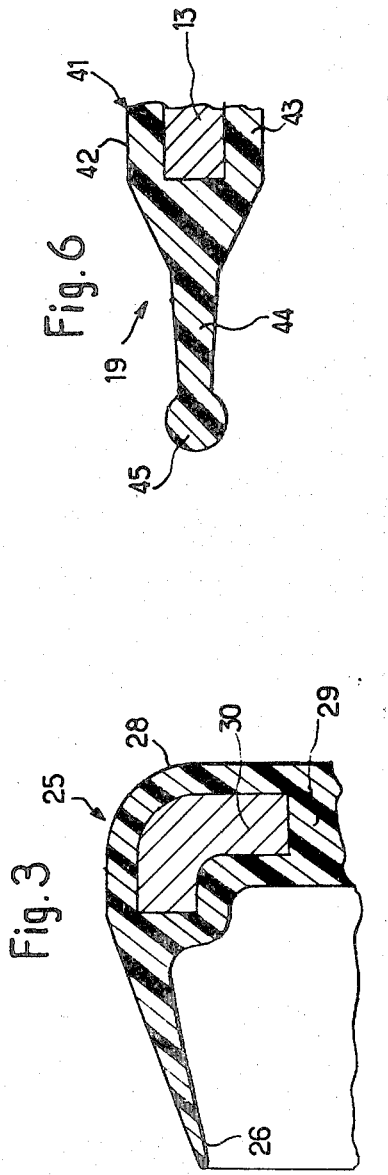

DEVICE FOR MOUNTING OF A SHUTTER IN A PIPING OF A HEATING OR AIR-CONDITIONING INSTALLATION OF A MOTOR VEHICLE

FIELD OF THE INVENTION

The invention relates to a rotative mounting device of a shutter or valve in a piping of a heating or air-conditioning installation of a motor vehicle passenger space.

PRIOR ART

The known devices for rotatably mounting a shutter in a piping comprise generally a fairly large number of parts which have to be assembled together prior and during the mounting of the shutter in the piping, since the rotation of the shutter about an axis with a driving force of acceptable value, the tightness of the piping by the seal established by the shutter, a connection between the shutter driving member and the shutter itself, etc. have to be provided simultaneously.

Thus, the complete mounting of a shutter in a piping is a relatively lengthy and costly operation due to the number of parts involved.

SUMMARY OF THE INVENTION

An object of the invention is in particular to provide a shutter assembly which obviates such disadvantages.

To this effect, the invention provides a rotative mounting device for a sealing shutter in a piping, particularly a heating or air-conditioning installation of a motor vehicle passenger space, wherein the wall of the piping comprises two opposite bearings adapted for receiving cylindrical end-pieces formed on two opposite sides of the shutter, each bearing being surrounded by a cylindrical projection extending towards the inside of the piping and being in a tight-fit relationship with a tubular lip made of a resiliently deformable material which is part of the shutter.

Thus, according to the invention, the shutter, its rotative mounting cylindrical end-pieces and the sealing tubular lips are integrally made in one piece, thereby considerably simplifying the assembly and mounting operations.

The invention allows grouping all the aforementiond functions, viz. the rotative mounting of the shutter, the tightness, the limitation of the movement, the driving, etc., by using the cooperating of the shutter rotative axes or end-pieces with the piping walls, while providing in a simple way the tightness of the mounting around the bearings and inner projections of the piping walls so as to ensure a complete sealing off of the piping by the shutter.

According to further characteristics of the invention, each tubular lip forms the edge of a cup made of a resiliently deformable material, and said cups are part of a seal bordering the shutter sides.

BRIEF DESCRIPTION OF THE DRAWING

In the following description which is given by way of example, reference is made to the accompanying drawings wherein:

FIG. 1 is a frontal view, with parts cut away, of a shutter with a mounting device according to the invention, FIG. 2 is a sectional view along line II—II in FIG. 1, FIG. 3 is a sectional view on a larger scale of a portion of the shutter, FIG. 6 is a sectional view on a larger scale of a shutter edge.

DETAILED DESCRIPTION

Figure 4:
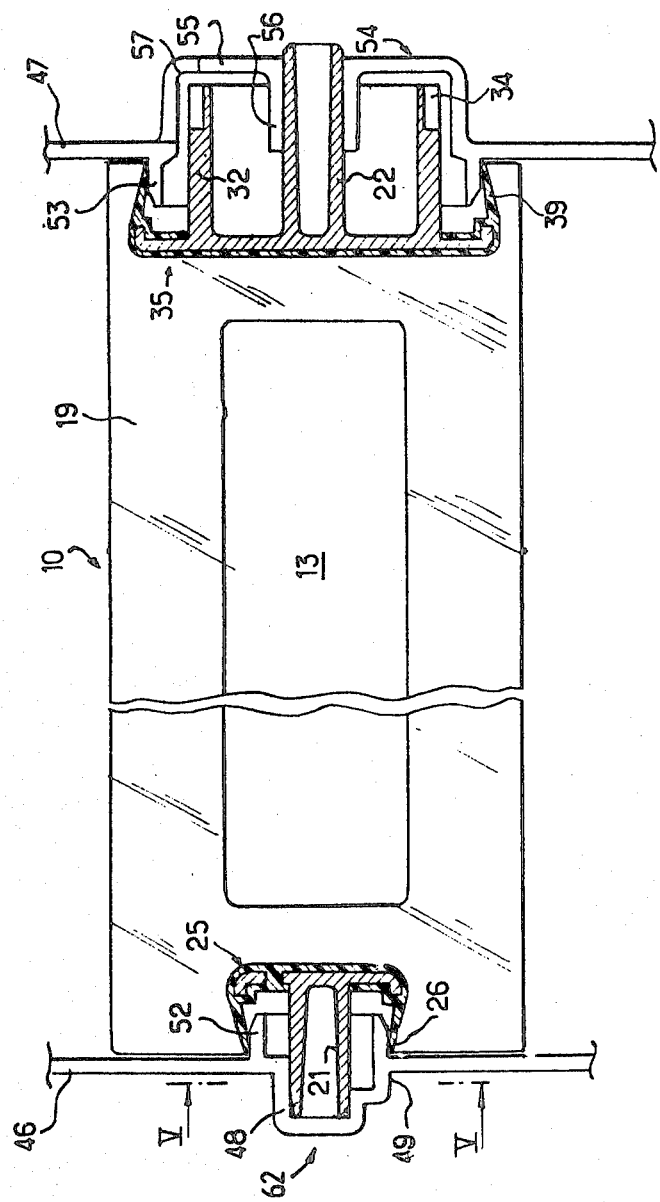
FIG. 4 is a frontal view, with parts cut away, of the shutter shown mounted in a piping.
Figure 5:
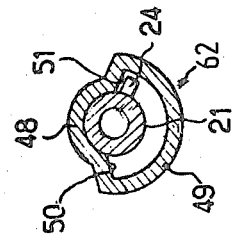
FIG. 5 is a sectional view along line V—V in FIG. 4.

The shutter or valve 10 shown in the drawings is of general rectangular shape and can be plane or in the shape of a dihedron (as is shown in FIG. 2) and is then formed of two panels 11 and 12 defining an included obtuse angle. The shutter has a body 13 advantageously made of a plastic material and formed along the median line 14 with transverse holes 15 and 16 as well as holes 17 and 18 positioned along two longitudinal rows parallel to said longitudinal median line 14. Said holes allow moulding onto the body 13 of the shutter a rubber seal 19, of general rectangular ring shape, comprising cores 20 housed inside holes 15, 16, 17, 18. The shutter body 13 is formed, at its ends, with tubular end-pieces 21, 22 projecting from the small transverse sides of the shutter and arranged substantially along to the median longitudinal axis 14 of the shutter. The tubular end-piece 21, which protrudes relative to the transverse edge 23 of the shutter body, has a substantially circular outer cross-section and is formed with a radial projection 24 extending over the major portion of its length. The end-piece 21 is surrounded, with a spacing, by the edge of a cup 25 which is part of the moulded seal 19, the edge of said cup being tapered in the direction of its outer rim so as to form a tubular lip 26 substantially circular and flush with the transverse edge 27 of seal 19. The bottom 28 of the cup comprises cores 29 housed inside anchoring holes formed in a disc 30 extending perpendicular to axis 14 and constituting part of the shutter body 13. The cup bottom 28 in thus moulded on either side of disc 30, on the one hand onto a face of said disc around the end-piece 21, and on the other hand onto the opposite face of said disc.

The other tubular end-piece 22 depending from the other transverse side of the shutter body 13 has also a cylindrical outer surface with a circular cross-section and is formed with a radial projection 31 over part of its length. The tubular end-piece 22 is surrounded, with spacing, by a cylindrical crown 32 having an annular bottom 33 and projecting from the shutter body 13. The end of crown 32 is formed with an outer toothing 34. The cylindrical crown 32 is in turn surrounded, with spacing, by the substantially frustonical edge of a cup 35 at the circular bottom 36 of which is moulded onto a disc 37 which forms the annular bottom 33 of crown 32 and is provided with anchoring holes in which the cores 38 of cup 35 are fitted. The outer edge of said cup is tapered and forms also a circular sealing lip 39 flush with the transverse edge 40 of seal 19.

The seal 19 extends regularly along the four sides of the shutter, except at the level of cups 25 and 35, and it is composed of a body 41 with two flanges or wings 42 and 43 enclosing the edge of the shutter body 13, said body extending into a thinner portion 44 in the plane of the corresponding shutter portion and ending in a cylindrical bead 45 (FIG. 6).

The shutter 10 is adapted for being mounted in a piping comprising two opposite plane walls 46 and 47 (FIG. 4) connected by two wall sections 60 and 61 shown in phantom in FIG. 2 and which can have a curved shape in some cases.

As is shown in FIG. 4, the piping wall 46 is formed with an outer boss 62 defining a blind opening adapted for receiving the tubular end-piece 21 of shutter 10. This outer boss 62 comprises a first portion 48 the inner surface of which forms a cylindrical partial bearing in engagement with the cylindrical outer surface of the tubular end-piece 21, and a second portion 49, of larger diameter, the inner surface of which is joined to the inner surface of the first portion 48 through shoulders 50 and 51 forming abutments for the radial projection 24 of end-piece 21.

The inner face of the piping wall 46 is formed with a cylindrical projection 52 substantially of same diameter as the second portion 49 of boss 62 and adapted for being in sealing relationship with the tubular lip 26 of shutter 10.

The other wall 47 of the piping is also formed on its inner face with a cylindrical projection 53 adapted for being in engagement with a tubular lip 39 of cup 35. The edges of the two cylindrical projections 52 and 53 of the piping walls are chamfered for facilitating the mounting of the sealing tubular lips which are slightly frustoconical in shape.

The outer face of wall 47 is formed with a cylindrical boss 54, coaxial with the cylindrical projection 53 but with a slightly smaller diameter, the bottom 55 of which comprises a cylindrical bearing 56 open at its two ends and through which extends the tubular end-piece 22 of shutter 10. The boss 54 is also formed with a window 57 of sufficient dimensions for a driving member (such as a pinion, a toothed gear, a ract, etc.) to mesh with the toothing 34 of the cylindrical crown 32.

The walls 46 and 47 are part of two half shells, one of them being formed with boss 62 and the other with boss 54, so as to allow the introduction and the positioning of the shutter 10 and of its tubular end-pieces 21 and 22.

It is to be appreciated that the shutter and its mounting device according to the invention allow simplifying in a large measure, the assembly of the motor vehicle heating and/or air-conditioning case assemblies, since the only operation needed is to position a shutter (which is integral with its seals) in a casing, the single seal which is moulded onto the shutter providing all the necessary sealing functions, through the engagement of the tubular lips 26 and 39 with the cylindrical projections 52 and 53 as well as through the engagement of the cylindrical bead 35 with the piping walls which are to be sealed by shutter 10.

I claim:

1. A device for rotatably and sealingly mounting a sealing shutter in a piping of a motor-vehicle heating or air-conditioning installation, said piping including a wall having a cylindrical hole and a tubular cylindrical projection around said hole and extending inside the piping, said shutter having at least one side with a cylindrical end-piece adapted to be received in said hole and including a tubular lip integral with the shutter around said end-piece, said lip being made of a resiliently deformable material and having an internal tubular surface sealingly applied on an external surface of said cylindrical projection on the piping wall.

2. A device according to claim 1, wherein said tubular lip is of frustoconical shape.

3. A device according to claim 1 or 2, wherein said tubular lip forms the edges of a cup.

4. A device according to claim 3, wherein said cup includes a bottom which bears against an annular surface on the corresponding side of the shutter.

5. A device according to claims 4, wherein said cup is a part of a seal bordering the shutter sides.

6. A device according to claim 5, wherein said seal is moulded onto the periphery of the shutter.

7. A device according to claim 1 wherein said piping includes a second wall opposite the first said wall and between which walls said sealing shutter is rotatable between open and closed positions.

8. A device according to claim 7 wherein said second wall has a blind opening and a tubular cylindrical projection around said blind opening and extending inside said piping, said shutter having a second side with a second cylindrical end-piece adapted to be received in said blind opening and including a second lip integral with said shutter around said second end-piece, said second lip being made of a resiliently deformable material and having an internal tubular surface sealingly applied on an external surface of said cylindrical projection on said second wall.

9. A device according to claim 8, wherein the said second end-piece housed inside the blind opening of said second wall includes a lug or projection which is in an abutment relationship with shoulders of said blind opening.

10. A device according to claim 8, wherein the first said end-piece housed inside said hole comprises means for driving the shutter.

11. A device according to claim 10, wherein said driving means comprises a crown surrounding said first end-piece and having a toothing adapted for meshing with an outer drive pinion.

12. Apparatus for rotatably and sealingly mounting a sealing shutter in a piping of a motor vehicle heating or air-conditioning installation, said piping including first and second opposed end walls spaced from one another and respectively including means for rotatably and sealingly supporting said shutter at opposite sides thereof, said means on one of said end walls comprising means defining a bore at said one end wall and a projection surrounding said bore and extending into the space between said end walls towards the other of said end walls, said shutter including, at the side thereof facing said one end wall, a cylindrical end piece supported in said bore and a tubular lip fixed to said shutter and surrounding said end piece in spaced relation therewith, said lip being made of a resiliently deformable material and having an internal tubular surface sealingly applied to said cylindrical projection on the outer surface thereof.

13. Apparatus according to claim 12 comprising a seal means on said shutter at the periphery thereof and integrally formed with said tubular lip.

14. Apparatus according to claim 12 wherein said means on the other of said end walls for rotatably and sealingly supporting said shutter comprises means defining a bore at said other end wall and a second cylindrical projection surrounding said bore and extending into the space between said end walls towards said one end wall, said shutter including, at the side thereof facing said other end wall, a second cylindrical end piece supported in said bore in said other wall and a second tubular lip fixed to said shutter and surrounding said second end piece in spaced relation therewith, said second lip being made of a resiliently deformable material and having an internal tubular surface sealing applied to said second cylindrical projection on the outer surface thereof.

15. Apparatus according to claim 14 wherein one of said bores in said end walls extends through the respective wall while the other of said bores is a blind bore.

* * * * *